Aug. 18, 1931.  C. W. SLEEPER ET AL  1,819,043
VALVE
Filed Dec. 27, 1927   2 Sheets-Sheet 1
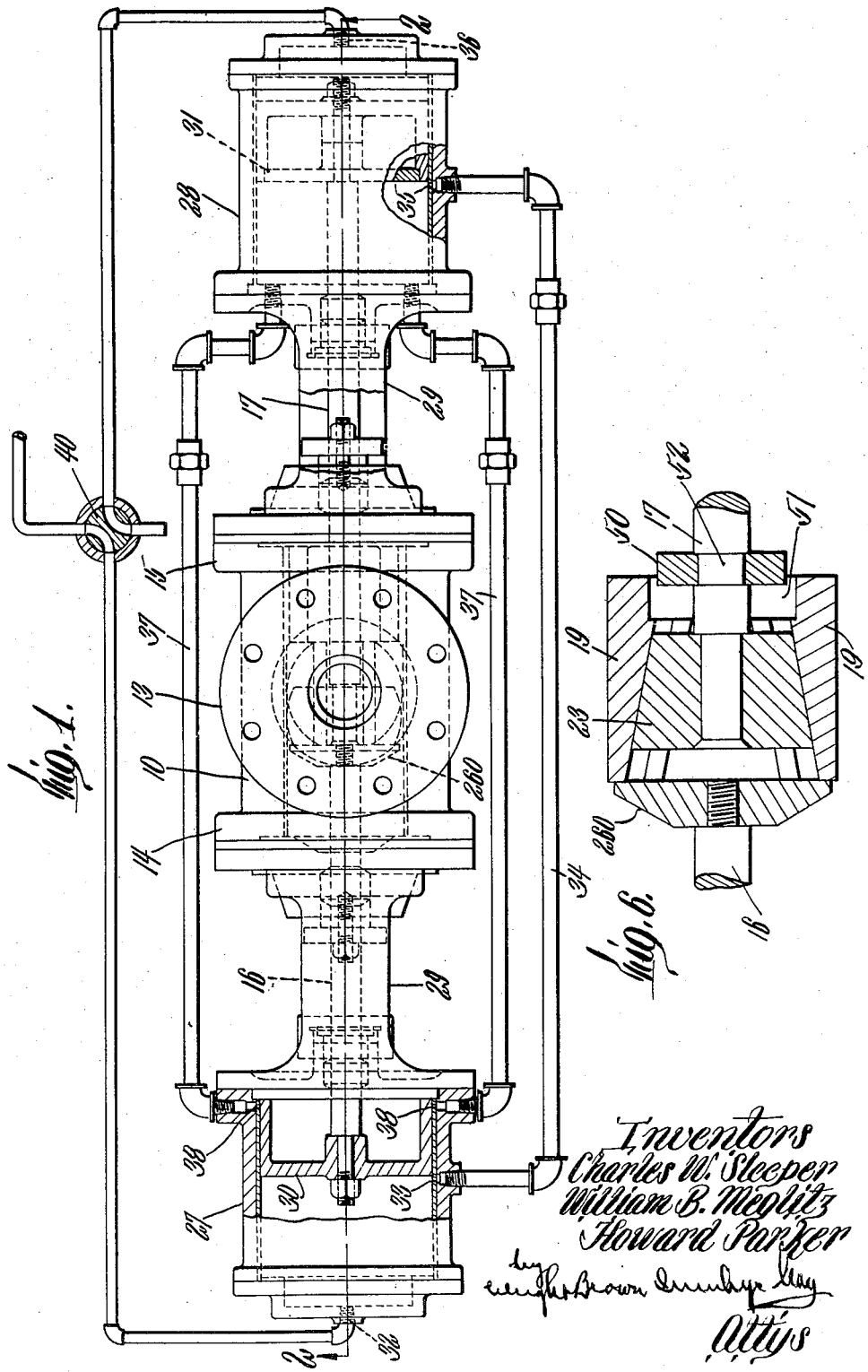
Inventors
Charles W. Sleeper
William B. Meglitz
Howard Parker

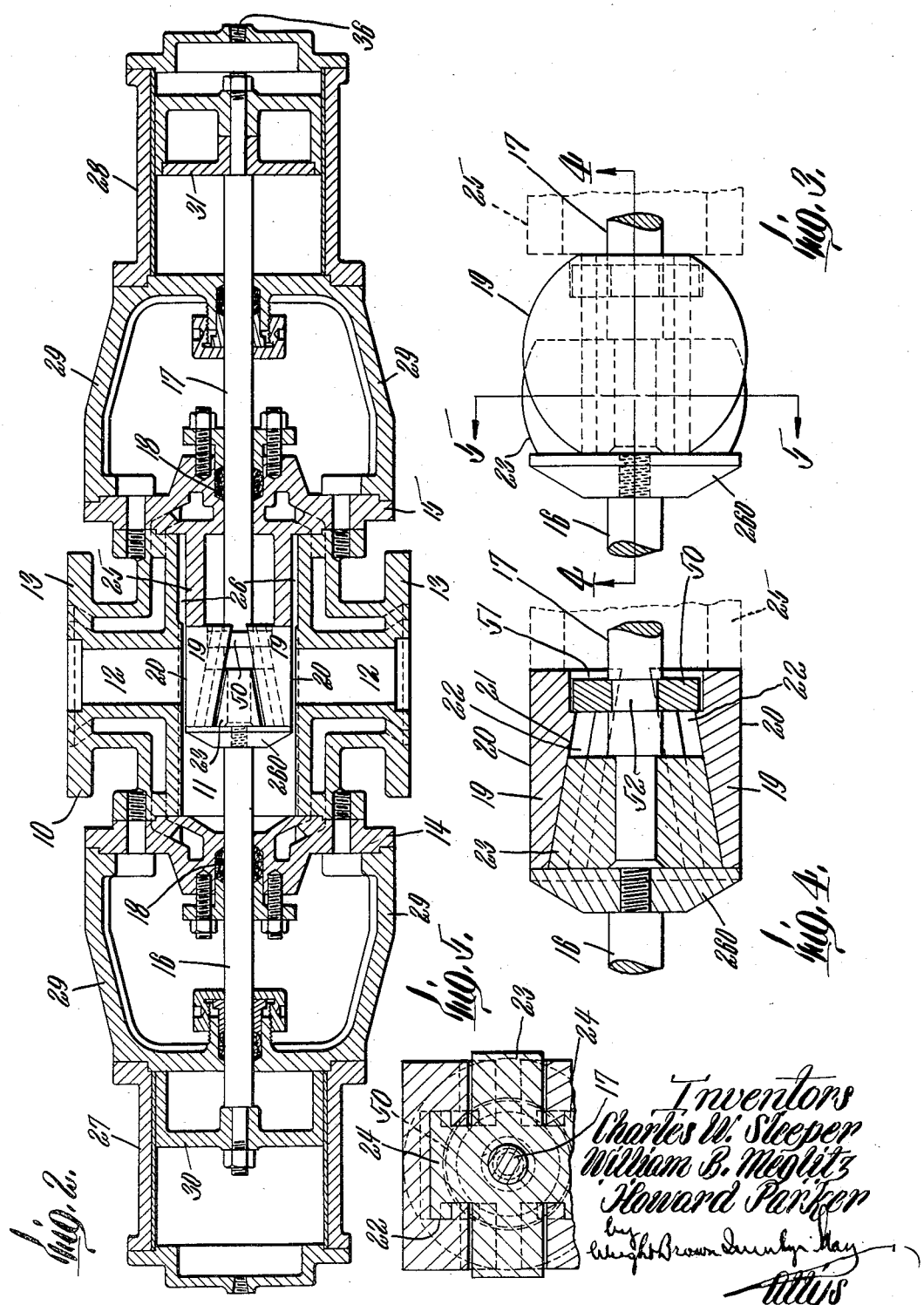

UNITED STATES PATENT OFFICE

CHARLES W. SLEEPER AND WILLIAM B. MEGLITZ, OF LANCASTER, AND HOWARD PARKER, OF BERLIN, NEW HAMPSHIRE, ASSIGNORS TO BROWN COMPANY, OF BERLIN, NEW HAMPSHIRE, A CORPORATION OF MAINE

VALVE

Application filed December 27, 1927. Serial No. 242,681.

This invention relates to valves for cutting off the flow of a fluid through a pipe. It is an object of the invention to provide a valve which can be installed in places to which access is difficult, and can be readily operated from a distance by hydraulic connections. It is also an object of the invention to provide a valve which is not liable to be clogged by foreign matter in the valve chamber but which clears itself automatically in closing. To this end, the valve is preferably constructed with a pair of closure members which are adapted to move first across the orifices in the chamber walls leading to the connecting pipes and then over tightly against the valve seats at the sides of the chamber to cover and close off the orifices. The motions of the closure members across and then against the orifices may be brought about automatically by hydraulic mechanism which may be controlled by a hand valve located at any convenient place as desired. A valve of the type embodying the invention may, for example, be used in the supply line carrying molten pitch or other heated fluid. It is often advantageous to locate such valves close to the tanks wherein the fluid is used. As the space for the valves is often confined and close to the heated tanks, it is highly desirable that the valves be operable from a distance and that the liability to clog be reduced to a minimum. Hence the valve embodying this invention is designed to be positive in action, both when closing and when opening, and to push obstructing material out of the way when closing. When used for heated fluids, such as molten pitch, the valve is preferably steam-jacketed to prevent clogging by a chilling and congealing of the fluid in the valve chamber.

Various other advantageous features of construction will be apparent to one skilled in the art from the disclosure of the invention in the following description and on the drawings, of which,—

Figure 1 is a side elevation of a valve embodying the invention, portions being broken away to show interior working parts in section.

Figure 2 is a longitudinal section on the line 2—2 of Figure 1.

Figure 3 is a side elevation of certain of the working parts within the valve chamber.

Figure 4 is a section on the line 4—4 of Figure 3.

Figure 5 is a section on the line 5—5 of Figure 3.

Figure 6 shows the parts illustrated in Figure 4, but in a different position of operation.

Referring to the drawings in detail, 10 represents a casing containing a valve chamber 11. Inlet and outlet ports 12 open into the chamber 11 and are connectable with suitable pipes as by flange connections 13. The ends of the chamber 11 may be closed by castings 14, 15 which are preferably perforated to receive therethrough piston rods 16 and 17, suitable stuffing boxes 18 being provided to prevent leakage around these rods. The casing 10 may be steam-jacketed to provide for the heating of the valve when used with the hot fluids, such as molten pitch, asphalt, or the like. Within the valve chamber 11 a pair of closure members 19 are mounted to slide longitudinally to and from positions opposite the orifices of the inlet and outlet ports 12. Each closure member 19 is formed with an outer face 20 adapted to engage over the orifice of the inlet or outlet port, and an inner inclined face 21 which as shown in Figure 5 may be centrally grooved, the groove being undercut on one or both sides as at 22. The inclined faces 21 are disposed at an angle to each other so as to receive between them a wedge member 23 which is provided with lateral tongues 24 shaped to fit into the grooves in the inner faces of the closure members 19. It is apparent from Figures 4 and 6 that motion of the wedge 23 toward the right with respect to the closure members 19 will result in a spreading apart or lateral motion of the closure members so as to force them tightly against their respective ports. In like manner, motion of the wedge member 23 towards the left with respect to the closure members 19 will positively draw these members toward each other on account of the undercut portions 22 of the grooves in the inner faces of the closure members 19. Figure 2 illustrates the closure members 19 positioned opposite to and between the ports 12, but not pushed thereagainst by the wedge 23. This position of the closure members may be determined by suitable stop members 25 within the chamber 11. In closing the valve, the closure members 19 are first pushed toward the right to the position shown in Figure 2, whereupon the wedge 23 is moved further to the right to exert a spreading or separating force on the members 19 and thus to push them tightly against the ports 12 to seal them. In case sediment or foreign matter collects in the valve chamber, the direct longitudinal motion of the closure members 19 will push such sediment out of the way, suitable clearance spaces 26 being provided therefor. Thus the valve automatically clears itself when closing and removes from the valve seats about the ports 12 any sediment which might otherwise prevent good contact between the closure members and the valve seats. In opening the valve, the wedge 23 is pushed toward the left, this motion resulting in a drawing together of the closure members 19 to displace them from contact with the valve seats, followed by a motion toward the left of the closure members with the wedge 23 to a position clear of the ports 12. In order to ensure positive movement of the closure members 19 to the right when the valve is closing, a suitable disk 260 may be mounted in the chamber 11 on the end of the piston rod 16, this disk being arranged to engage against the left hand ends of the closure members and the wedge 23. To ensure positive opening movement of the closure members toward the left without binding or jamming, a split collar 50 may be sprung on to a reduced portion 52 of the rod 17. The right hand ends of the closure members 19 are recessed as at 51 to receive the collar 50. The wedge 23 is preferably secured to the end of the piston rod 17. In order to actuate the rods 16 and 17, we provide suitable cylinders 27, 28 which may be rigidly secured to the casing 10 as by bridge members 29. The cylinders 27 and 28 are made fluid tight and contain pistons 30 and 31, respectively, which are operable by power fluid introduced into the cylinders. Referring to Figure 1, the power fluid which may be water, oil, air, steam, or the like, is preferably introduced into the chamber 27 at a suitable port 32. Assuming the piston 30 to be at its extreme position to the left, this power fluid will exert a pressure on the piston 30 tending to move it toward the right. This in turn moves the disk 260 through the rod 16 which in turn pushes the closure members 19, the wedge 23, the rod 17 and the piston 31 toward the right. When the parts reach the position illustrated in Figure 2, the piston 30 uncovers a port 33 which is connected as by a suitable pipe 34 to a port 35 in the cylinder 28. Thus pressure is thereupon exerted on the piston 31 resulting in a further movement of this piston and of the wedge 23 which is connected thereto toward the right. This results in the spreading of the closure members and the wedging thereof against the ports 12. As wedging action of the wedge 23 affords a large mechanical advantage, the closure members 19 are pressed powerfully against the valve seats about the ports 12, so that an effective closure of the ports results. When it is desired to open the valve, the port 32 is connected to an exhaust port while a port 36 in the cylinder 28 is connected with the power fluid supply. The power fluid thus acts on the piston 31 to move it toward the left, the motion of the piston being transmitted to the wedge 23 which acts to draw the closure members 19 toward each other to clear the valve seats and also tends to move them toward the left in the valve chamber. The collar 50 also moves to the left with the rod 17 and positively ensures the motion of the closure members 19 to the left to clear the ports 12. The fluid in the cylinder 28 to the left of the piston 31 is allowed to flow through suitable pipes 37 and to enter the cylinder 27 through ports 38 so as to act on the right hand face of the piston 30 and to move this piston toward the left. Thus the closure members 19 and the wedge 23 are moved entirely clear of the ports 12 so as to allow free flow of fluid through the ports 12 and the chamber 11.

The ports 32 and 36 by which power fluid is admitted to and exhausted from the cylinders 27 and 28, are preferably connected by suitable piping to a three-way valve 40 which may be located at any convenient position near to or at a distance from the main valve, the three-way valve for the power fluid being manually operable to admit power fluid selectively to either of the two cylinders and at the same time to connect the other cylinder with an exhaust drain in a manner well known in the art.

The valve may be installed horizontally as shown or vertically with either end up. It works satisfactorily in any position.

Having thus described certain embodiments of our invention, it should be evident to those skilled in the art that various changes and modifications may be made therein without departing from its spirit or scope as defined by the appended claims.

We claim:—

1. A valve having a chamber with opposed inlet and outlet ports, a pair of closure members, a wedge operatively positioned therebetween, pressure fluid actuable means for moving said members positively to a position between said ports and for thereafter moving the wedge relatively to the members to spread the latter and press them against said ports, said means being also actuable to move said members toward each other, and to move said wedge and members from their position between said ports.

2. A valve having a chamber with opposed inlet and outlet ports, means movable within said chamber to close said ports by two separate motions, a pair of cylinders, pistons in said cylinders, connections between one of said pistons and said movable means for effecting the first closing motion, connections between the other said piston and said movable means for effecting the second closing motion, and means for automatically operating said pistons in succession.

3. A valve comprising a casing enclosing a chamber having inlet and outlet ports leading laterally therefrom, a pair of cylinders supported by said casing and alined with said chamber, a piston in each of said cylinders, a pair of closure members movable longitudinally within said chamber to and from a position opposite said ports, means connected to one of said pistons for moving said closure members to the position opposite said ports, and means connected to the other said piston for moving said closure members when opposite said ports to engage over and to close said ports, means connected to the other of said pistons for disengaging said closure members from over said ports and for moving said members away from the position opposite said ports, and pressure fluid connections with said cylinders for successively actuating said pistons.

4. A valve having a chamber with a pair of opposed inlet and outlet ports, a pair of closure members in said chamber movable to and from positions between said ports, said members being also capable of relative movement toward and away from each other a fluid-actuable piston, a thrust element operatively connected to said piston and directly engageable with said members to move said members positively while relatively close together to positions between said ports, a second fluid-actuable piston, and means actuable by said second piston to move said members away from each other whereby each member seats over its corresponding port.

5. A valve having a chamber with a pair of opposed inlet and outlet ports, a pair of closure members in said chamber movable to and from positions between said ports, said members being also capable of relative movement toward and away from each other, a fluid-actuable piston, a thrust element operatively connected to said piston and directly engageable with said members to move said members positively while relatively close to each other to positions between said ports, a second fluid-actuable piston, means actuable by said second piston to move said members to their mutually remote position whereby each member seats over its corresponding port, a valve for admitting power fluid to act on said first piston, and a second valve opening automatically when said first piston reaches the end of its member-moving stroke to admit power fluid to act on said second piston.

In testimony whereof we have affixed our signatures.

CHARLES W. SLEEPER.
WILLIAM B. MEGLITZ.
HOWARD PARKER.